INVENTOR.
Mark H. Annin
Conrad A. LaSalle
BY
Atty.

INVENTORS
Mark H. Annin
BY Conrad A. LaSalle

Frank Wells
Atty.

July 19, 1960 M. H. ANNIN ET AL 2,945,551
PORTABLE PLATFORM ELEVATING DEVICE
Filed Aug. 5, 1957 8 Sheets-Sheet 5

INVENTOR.
Mark H. Annin
Conrad A. LaSalle
BY
Atty.

July 19, 1960   M. H. ANNIN ET AL   2,945,551
PORTABLE PLATFORM ELEVATING DEVICE
Filed Aug. 5, 1957   8 Sheets-Sheet 6
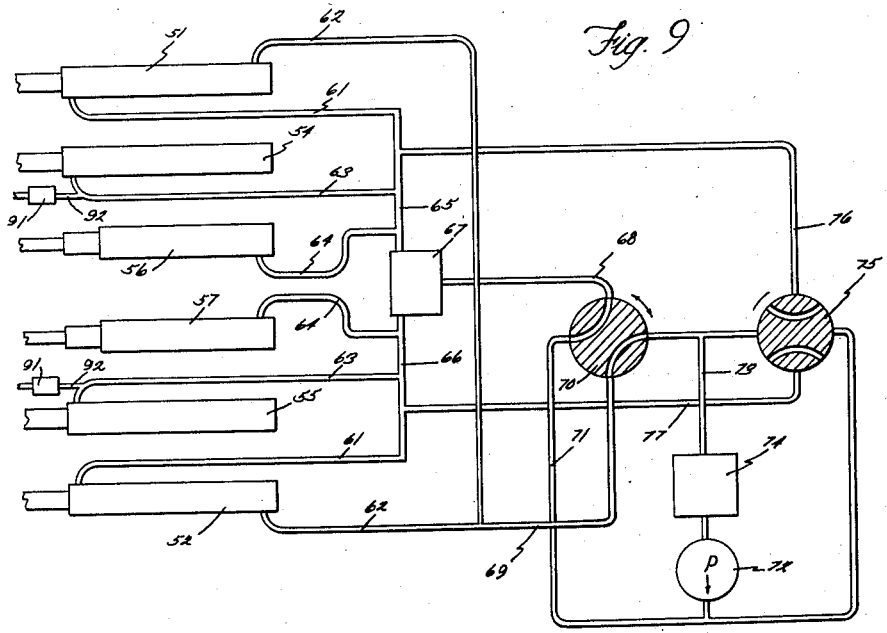
INVENTOR.
Mark H. Annin
Conrad A. LaSalle
BY
Atty.

July 19, 1960  M. H. ANNIN ET AL  2,945,551
PORTABLE PLATFORM ELEVATING DEVICE
Filed Aug. 5, 1957  8 Sheets-Sheet 7
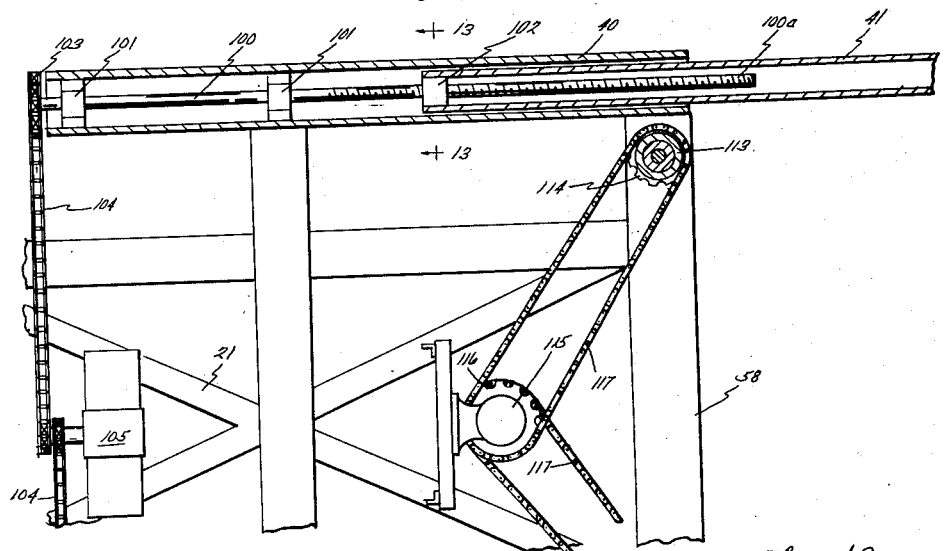
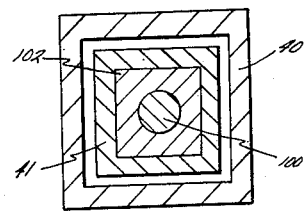
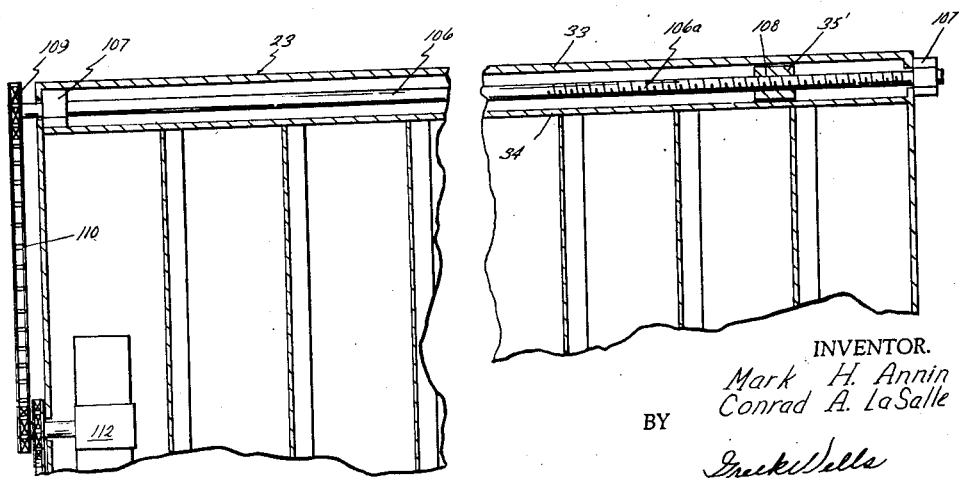
INVENTOR.
Mark H. Annin
Conrad A. LaSalle
BY
Atty.

July 19, 1960 M. H. ANNIN ET AL 2,945,551
PORTABLE PLATFORM ELEVATING DEVICE
Filed Aug. 5, 1957 8 Sheets-Sheet 8

INVENTORS.
Mark H. Annin
Conrad A. LaSalle
BY
Atty.

United States Patent Office 2,945,551
Patented July 19, 1960

1

2,945,551

PORTABLE PLATFORM ELEVATING DEVICE

Mark H. Annin and Conrad A. La Salle, both of P.O. Box 488, Hamilton, Mont.

Filed Aug. 5, 1957, Ser. No. 676,268

11 Claims. (Cl. 182—141)

The present invention relates to improvements in a lift platform.

The principal purpose of this invention is to provide a safe and efficient means for supporting a platform at any desired elevation through utilization of the old and well known "lazy tong" principle. We are aware that lazy tongs have in the past been suggested as a proper mechanism for supporting platforms and the like at adjusted heights, but past devices have not been entirely successful for one reason or another. We have found that our invention produces a simple lift platform mechanism which is both efficient and safe in its use, and which is adapted to be mounted upon and carried by an automotive vehicle.

More specifically it is the purpose of our invention to provide a device comprising a lazy tong framework, a platform supported on said framework, and means supporting said framework on an automotive vehicle, said means including a raising and lowering mechanism operable to force the lower ends of the lazy tong framework toward and away from each other to extend and retract the framework in a vertical direction.

A further purpose of the invention is to provide such a device including operating means at the top of the lazy tong framework operable to assist the raising and lowering means during vertical extension of the framework by forcing the upper ends of the framework toward each other.

Another purpose of the invention is to provide such a device including novel means for imparting initial lift to the platform when the framework is retracted, to overcome the reduced mechanical advantage of the upper and lower extending means existing when the framework is fully retracted.

Still another purpose of the invention is to provide in such a device, a novel safety device operable to support the platform in case of failure of the raising and lowering mechanism.

The nature and advantages of our invention will appear more clearly from the following description and the accompanying drawings, wherein a preferred form of the invention is shown. The description and drawings are illustrative only, however, and are not intended to limit the invention, except insofar as it is limited by the claims.

2

Figure 1:
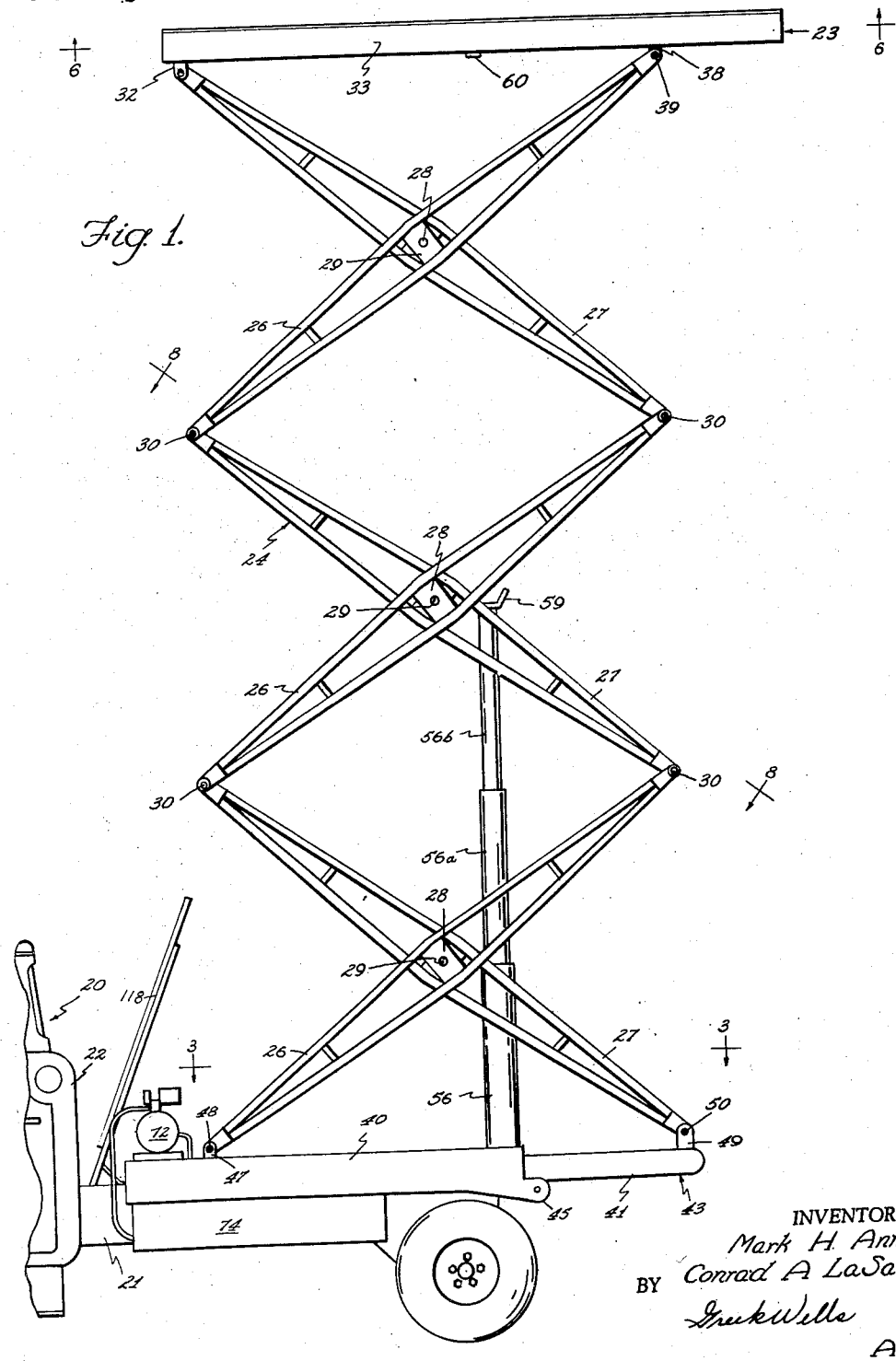
Figure 1 is a side view of our invention with the platform extended.
Figure 3:
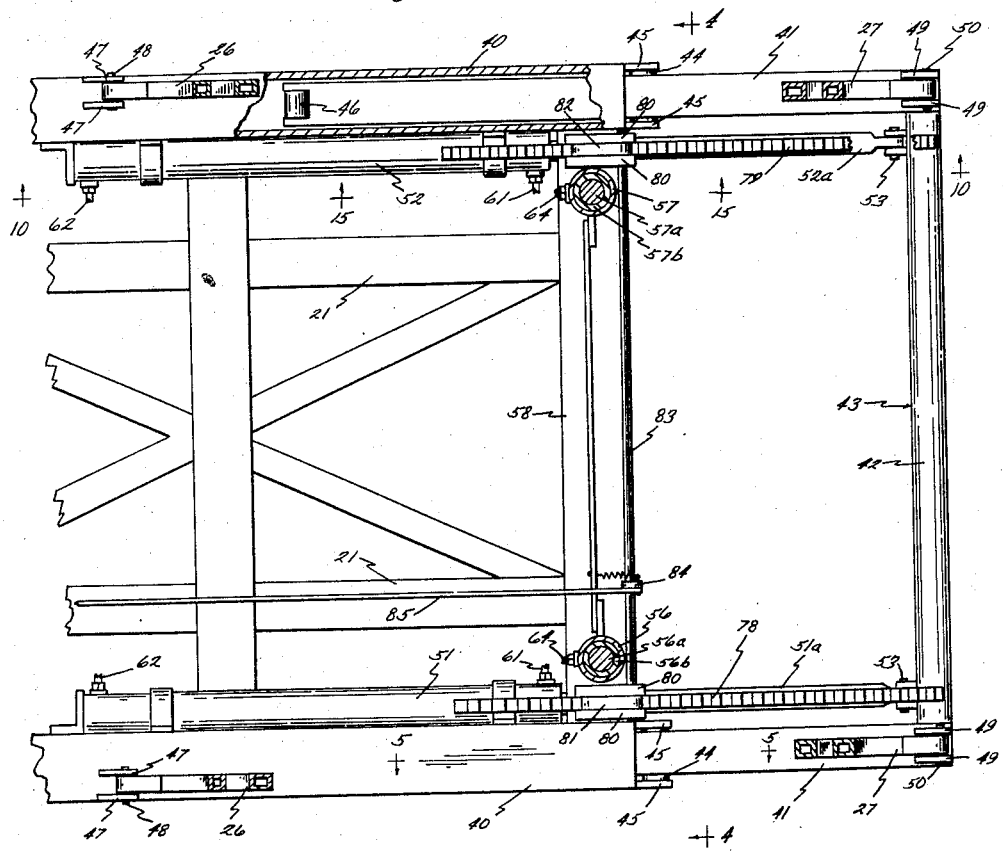
Figure 3 is an enlarged sectional view taken substantially on the line 3—3 of Figure 1.
Figure 10:
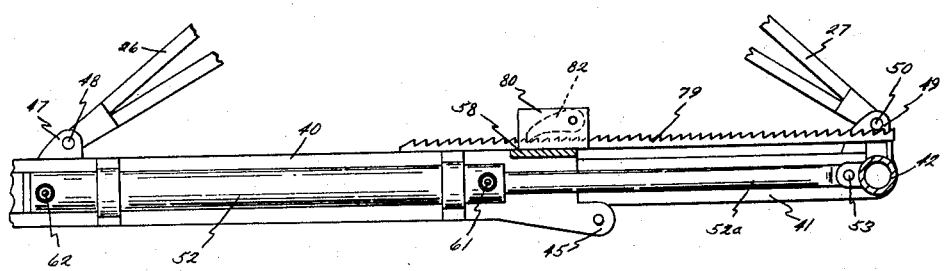
Figure 6:
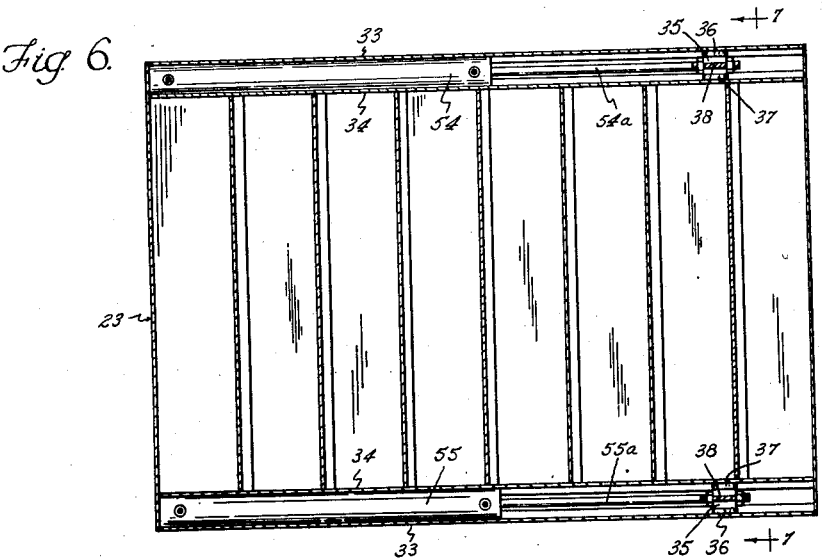
Figure 6 is a sectional view taken on the line 6—6 of Figure 1.
Figure 7:
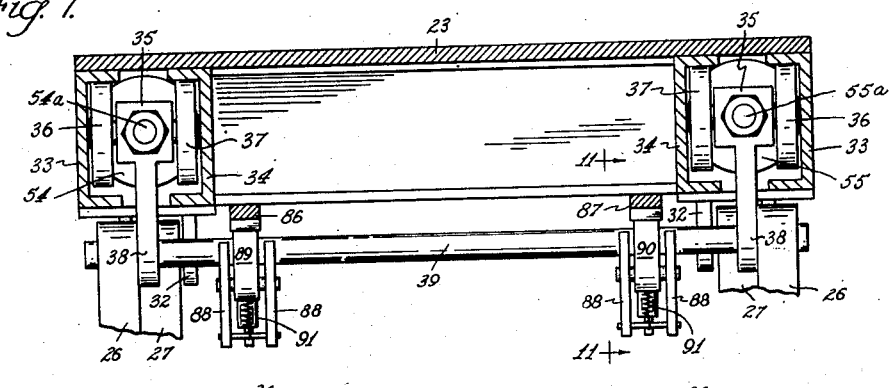
Figure 8:
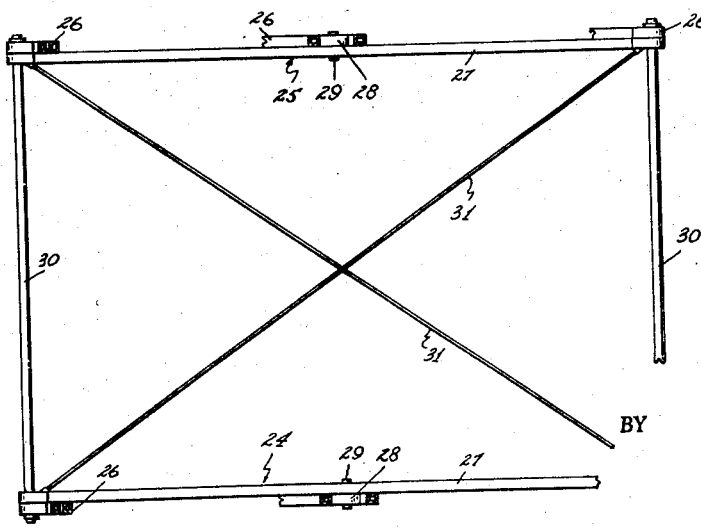
Figure 15:
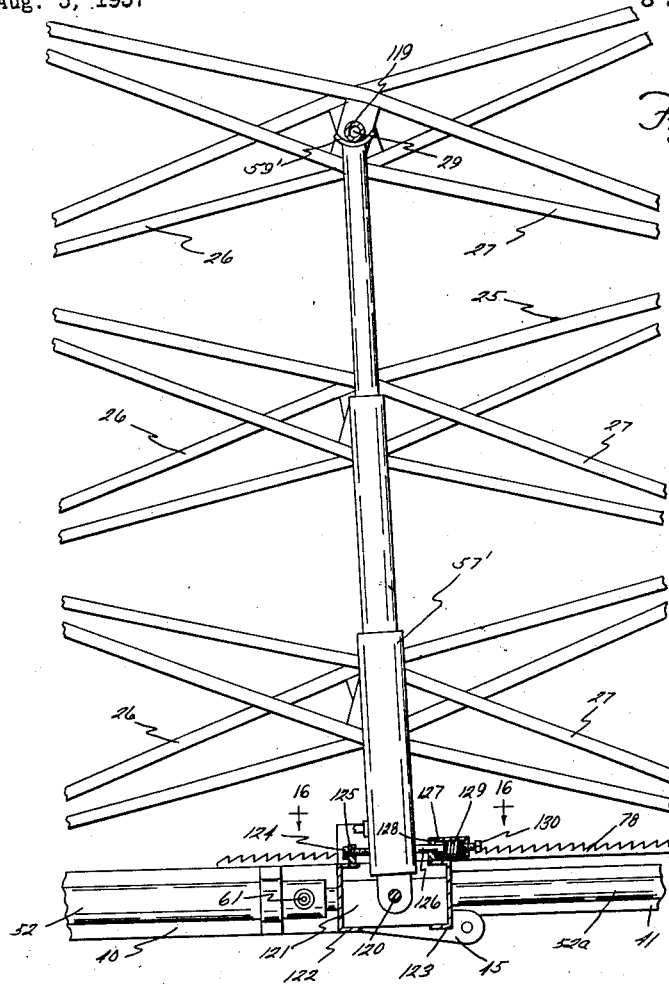
Figure 16:
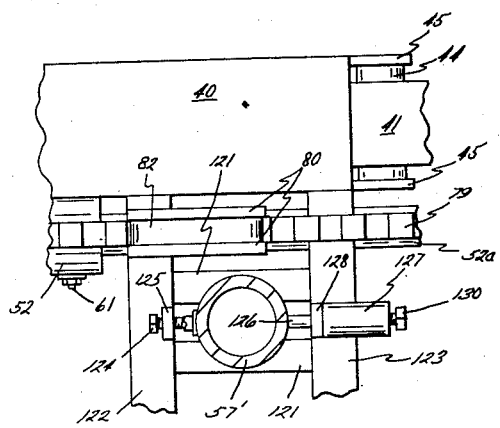

Figure 7 is an enlarged sectional view taken on the line 7—7 of Figure 6;

Figure 8 is a sectional view taken on the line 8—8 of Figure 1;

Figure 9 is a diagrammatic view of the hydraulic controls of the device;

Figure 10 is an enlarged fragmentary sectional view taken on the line 10—10 of Figure 3, illustrating the safety device, operable to support the platform in the event of failure of the hydraulic system;

Figure 11 is an enlarged fragmentary sectional view taken on the line 11—11 of Figure 7, of a similar safety device mounted on the platform;

Figure 12 is a fragmentary sectional view similar to Figure 3, but showing a modified form of the invention;

Figure 13 is an enlarged fragmentary sectional view taken on the line 13—13 of Figure 12;

Figure 14 is a view similar to Figure 6, but showing a modified form of the invention;

Figure 15 is a fragmentary sectional view taken substantially on the line 15—15 of Figure 3, but showing a further modified form of the invention; and Figure 16 is an enlarged fragmentary sectional view taken on the line 16—16 of Figure 15.

Figure 2:
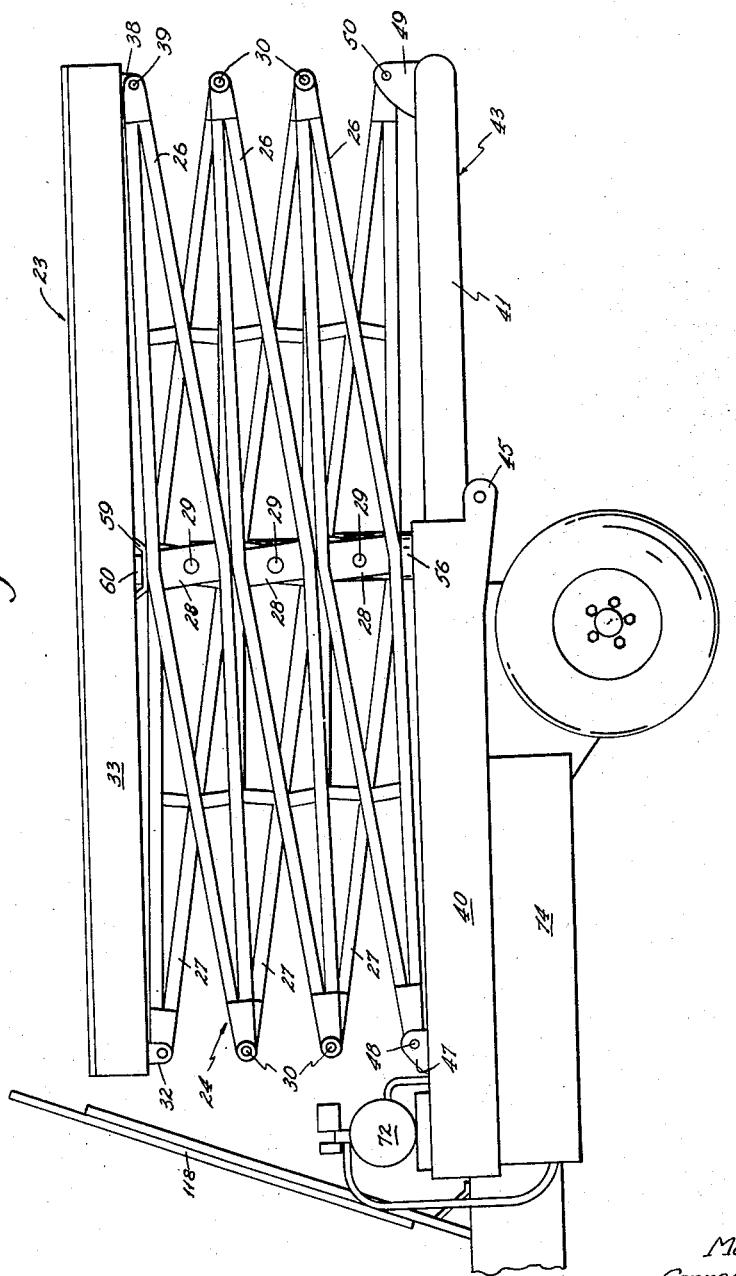
Figure 2 is an enlarged side view with the platform in its lowered position.

Referring now to the drawings, and to Figures 1 and 2 in particular, our invention is shown as mounted on a truck 20 on the rear frame 21 thereof behind the cab 22. The invention comprises a platform 23 which is supported on the truck frame by two transversely spaced vertically extensible lazy tong frames generally indicated at 24 and 25. Each of the lazy tong frames 24 and 25 is composed of three sets of diagonally extending truss members 26 and 27, the truss members 26 and 27 of each set having bearing blocks 28 at their centers, and being pivoted together at their centers by pivot pins 29 journalled in the bearing blocks 28. The three sets of members 26 and 27 in each lazy tong frame 24 and 25 are joined by pivot pins 30 which pivotally connect the lower ends of the upper set of members 26 and 27 to the upper ends of the intermediate set, and to pivotally connect the upper ends of the lower set of members 26 and 27 to the lower ends of the intermediate set, as clearly shown in Figure 1. The two transversely spaced lazy tong frames 24 and 25 are tied together to form a unitary frame as illustrated best in Figure 8. As shown, the pivot pins 30 which connect the ends of the truss members 26 and 27 extend between the frames 24 and 25 and pivot the corresponding truss members of each frame to make a unitary structure. Diagonal bracing rods 31 are also provided between the frames 24 and 25. Each truss member 26 or 27 has two bracing rods 31 secured thereto which extend to and connect with the corresponding truss member of the other lazy tong frame. This construction provides for operation of the frames 24 and 25 as a unit, and prevents twisting or warping thereof.

It will be understood that the frames 24 and 25 may be extended or retracted in a vertical direction by varying the horizontal distance between the ends of the diagonal truss members 26 and 27 of any set. As the ends of these members are pulled together, the truss members 26 and 27 pivot about the center pivot pins 29 in a scissor-like manner to swing into a more nearly vertical position, extending the lazy tong frames upwardly. As the ends of the members 26 and 27 are forced apart, the members 26 and 27 pivot toward a more nearly horizontal position to retract the lazy tong frames.

The platform 23 is supported at the upper ends of the frames 24 and 25. As best illustrated in Figures 6 and 7, the platform 23 has at its front corners depending ears 32 to which the upper free ends of the truss members 27 at the top of each lazy tong frame 24 and 25 are pivoted. The platform 23 also has thereunder, two sets of longitudinally extending channel members 33 and 34, one set at each side of the platform 23. The channel members 33 and 34 of each set or pair are positioned with their flanges facing each other to form rails. A slide block 35 is positioned between each pair of channels 33 and 34. The block 35 has rollers 36 and 37 rotatably mounted thereon that ride against the flanges of the channels 33 and 34. The rollers 36 and 37 permit the block 35 to move freely toward and away from the depending ears 32. The blocks 35 have ears 38 depending therefrom to which the upper ends of the truss members 26 at the tops of the lazy tong frames 24 and 25 are pivoted. The ends of the members 26 are pivoted to the ears by a pivot shaft 39 which extends between the ears 38 of the blocks 35 at each side of the platform 23, tying the blocks 35 together to move in unison. The platform 23 is thus supported on the frames 24 and 25 in such a manner that it does not hamper extension or retraction thereof.

Figure 5:
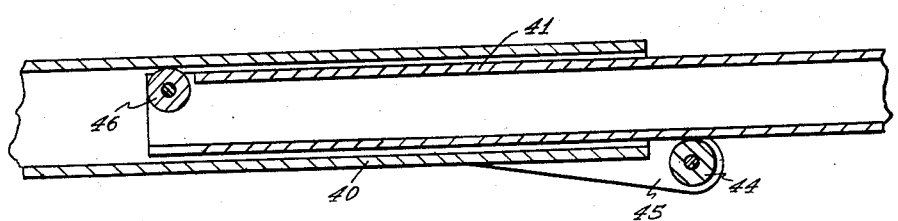
Figure 5 is an enlarged sectional view taken on the line 5—5 of Figure 3.

To support the frames 23 and 24 on the vehicle 20, we provide on the rear frame thereof, a pair of spaced apart, rearwardly extending tubular frame members 40. The frame members 40 are open at their rear ends, and receive the leg portions 41 of a yoke generally indicated at 43. The leg portions 41 of the yoke 43 are joined together by a rear crossbar 42. The leg portions 41 of the yoke 43 telescope into the frame members 40 to permit the yoke 43 to move longitudinally on the vehicle 20 toward and away from the front thereof. As illustrated in Figure 5, each frame member 40 has at the rear end thereof, a roller 44, which is journalled in ears 45 fixed to the member 40. The rollers 44 engage the lower surfaces of the leg portions 41 of the yoke 43. Second rollers 46 are journalled at the ends of the leg portions 46 and engage the top wall of the members 40. The purpose of the rollers 44 and 46, as will readily be seen, is to support the leg portions 41 for free movement into and out of the frame members 40.

The lower ends of the bottommost truss members 26 of each of the lazy tong frames 24 and 25 are pivoted to the frame members 40 near the front ends thereof. Each frame member 40 has a pair of upstanding ears 47 fixed thereon to which the lower ends of the truss members 26 are pivoted by pins 48. The lower ends of the bottommost truss member 27 of each of the lazy tong members 24 and 25 are pivoted to the yoke 43. The yoke 43 has at each of its rear corners a pair of upstanding ears 49 to which the lower ends of the truss members 27 are pivoted by pins 50. The frames 24 and 25 are thus supported on the vehicle 20 for extension and retraction in a vertical direction. As the yoke 43 is moved longitudinally toward and away from the cab 22 of the vehicle 20, the horizontal distance between the bottommost ends of the truss members 26 and 27 will be varied, thus extending or retracting the frames 24 and 25.

It will readily be understood that extension of the frames 24 and 25 in a vertical direction may be obtained by movement of the yoke 43 in a direction to bring the bottommost ends of the bottom truss members 26 and 27 together. To retract the frames 24 and 25 the yoke 43 may be moved in a direction to separate the lower ends of the truss members 26 and 27. This movement of the yoke 43 is accomplished by means of hydraulic cylinders 51 and 52. The cylinders 51 and 52, as shown in Figure 3, are mounted between the frame members 40 and have pistons 51a and 52a extending from the rear ends thereof. The pistons 51a and 52a are connected to ears 53 on the rear cross bar 42 of the yoke 43. The cylinders 51 and 52 are double acting, that is, they have hydraulic connections at each end thereof, so that the pistons 51a and 52a may be either extended or retracted by the cylinders 51 and 52. The hydraulic connections to the cylinders 51 and 52 and their operation will be described later herein.

While movement of the yoke 43 longitudinally on the vehicle 20 is sufficient to extend and retract the frames 24 and 25 without assistance, we have found that undesirable stresses in the frames 24 and 25 may be avoided, and best results obtained, if additional means are provided at the top of the frames 24 and 25 to assist in the extension of the frames. To provide this assistance a pair of hydraulic cylinders 54 and 55 are mounted beneath the platform 23 as shown in Figures 6 and 7. The cylinders 54 and 55 are mounted between the channels 33 and 34 at each side of the platform 23. The cylinders 54 and 55 have pistons 54a and 55a extending therefrom which are fixed to the slide blocks 35 that are supported between the channels 33 and 34.

With this construction, operation of the cylinders 54 and 55 to retract their pistons 54a and 55a causes the slide blocks 35 to be moved toward the cylinders 54 and 55 and toward the depending ears 32 at the front corners of the platform 23, thus drawing the upper ends of the uppermost truss members 26 and 27 together, and assisting the lower cylinders 51 and 52 in the extension of the frames 24 and 25.

Since the weight of the platform 23 and of the frames 24 and 25 operates to urge the frames 24 and 25 to retract, the cylinders 54 and 55 need not operate positively in this direction, so they are only provided with fluid inlets at one end, that is, they are only single acting cylinders.

Figure 4:
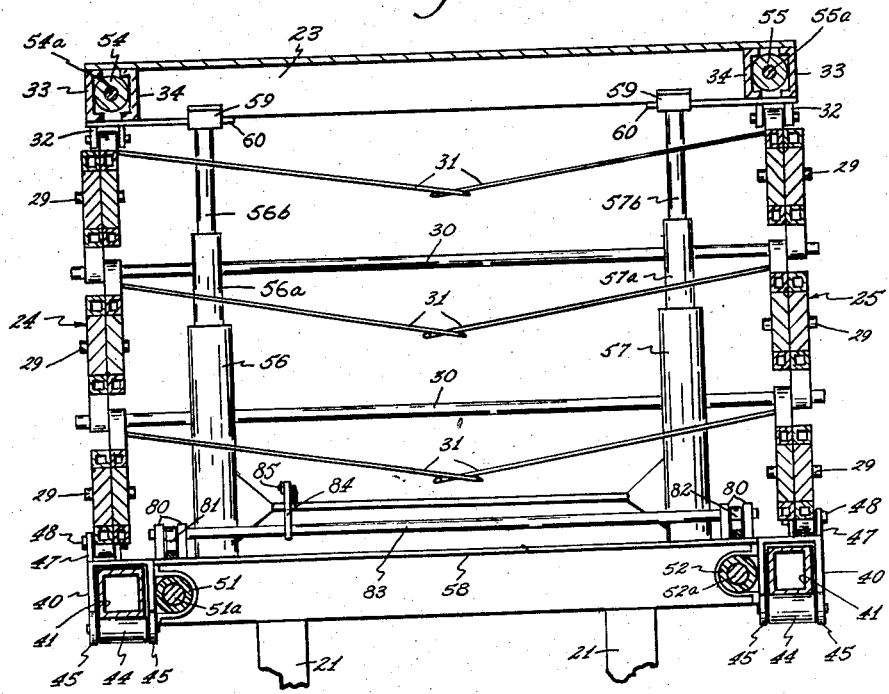
Figure 4 is a sectional view taken on the line 4—4 of Figure 3.

When the frames 24 and 25 are fully retracted, as shown in Figure 2, the truss members 26 and 27 thereof lie in a very nearly horizontal position, making the initial extension of the frames 24 and 25 through pulling the ends of the truss members 26 and 27 together very difficult. The nearly horizontal positioning of the truss members 26 and 27 reduces the mechanical advantage of the cylinders 51, 52, 54 and 55 to such an extent as to make initial extension by these cylinders practically impossible. In order to perform the initial extension of the frames 24 and 25, and to extend them enough to permit the cylinders 51, 52, 54 and 55 to operate effectively, we provide a pair of vertically extending jacks 56 and 57. As shown in Figures 3 and 4, the jacks 56 and 57 are mounted on a transverse support 58 carried by the vehicle frame 21. The jacks 56 and 57 are mounted between the frames 24 and 25 and operate directly against the platform 23. The jacks 56 and 57 include telescoping pistons 56a and 56b and 57a and 57b which are vertically extensible. The pistons 56b and 57b have yokes 59 at their free ends which engage bars 60 fixed to the underside of the platform 23. Fluid is supplied to each jack 56 and 57 at the bottom thereof to force the pistons 56a and 56b and 57a and 57b upwardly to lift the platform 23 far enough to make the cylinders 51, 52, 54 and 55 effective.

Figure 9 diagrammatically illustrates the fluid supply and control mechanism for the several cylinders 51, 52, 54 and 55, and the jacks 56 and 57. As shown, the lower cylinders 51 and 52 have fluid supply lines 61 leading thereto through which fluid may be supplied to retract the pistons 51a and 52a to raise the platform 23. Fluid supply lines 62 are provided through which fluid may be supplied to extend the pistons 51a and 52a to lower the platform 23. The upper cylinders 54 and 55 have fluid supply lines 63 through which fluid may be supplied to retract the pistons 54a and 55a to raise the platform 23. The jacks 56 and 57 have fluid lines 64 connected thereto through which fluid may be supplied to extend the jacks and raise the platform 23. The fluid lines 61, 63, and 64 of the cylinders 51 and 54, and the jacks 56 at the right hand side of the device are all connected to a common feed line 65. The fluid lines 61, 63 and 64 of the cylinders 52 and 55 and the jack 57 at the left hand side of the device are connected to a common feed line 66. The feed lines 65 and 66 are connected through an equalizing valve 67 to a main supply line 68. The fluid lines 62 of the lower cylinders 51 and 52 are connected together to a main supply line 69. The supply lines 68 and 69 are connected to a four way operating valve 70. A pressure line 71, extending from a motor driven pump 72 is also connected to the valve 70, as is a return line 73 extending from a reservoir 74. The valve 70 may be manually operated to connect the pressure line 71 to either one of the lines 68 or 69 and to connect the return line 73 to the other of the lines 68 or 69. When it is desired to raise the platform 23, the operator manipulates the valve 70 to connect the pressure line 71 to fluid line 68 and to connect the return line 73 to the fluid line 69. The pump 72 then forces fluid through the line 68 to the equalizer 67 where it is split into two streams of equal volume and passed through the feed lines 65 and 66 to operate the cylinders 51, 52, 54 and 55 to extend the frames 24 and 25, and to operate the jacks 56 and 57 to impart the initial lift to the platform 23. When the platform is to be lowered, the valve 70 is reversed, so that fluid is free to flow from the line 68 into the reservoir 74, and fluid under pressure is supplied to the lines 62 of the cylinders 51 and 52, to operate them to force the yoke 43 rearwardly and retract the frames 24 and 25.

While the equalizer 67 should always maintain the platform 23 level, it is possible that for one reason or another, the operating cylinders at one side may become unbalanced with respect to the other and thus carry the platform out of level. To correct this, we provide a four way levelling valve 75 to which are connected two bleeder lines 76 and 77. The bleeder line 76 connects with the right hand common feed line 65 and the bleeder line 77 connects with the left hand common feed line 66. The valve 75 is adapted to connect either one of the bleeder lines 76 and 77 to the pump 72 and the other to the reservoir 74 so that by operation of the valve 75, one side of the platform can be raised, and the other side lowered to bring it into level.

To insure the safety of those using the device, and to prevent the frames 24 and 25 from retracting in the event of failure of the hydraulic system, means are provided to stop descent of the platform in such an event. As shown in Figures 3 and 10, the yoke 43 is provided with a pair of longitudinally extending racks 78 and 79 which are fixed to the crossbar 42 thereof. The racks 78 and 79 overlie the pistons 51a and 52a and slidably rest upon the support 58. Upstanding ears 80 are fixed to the support 58 to provide guides for the racks 78 and 79. The ears 80 pivotally mount pawls 81 and 82 that are adapted to engage with the teeth of the racks 78 and 79, and prevent the yoke 43 from moving rearwardly in a direction to lower the platform. The pawls 81 and 82 are fixed to a shaft 83 which extends between the ears 80 at each side of the device. The shaft 83 has a lever 84 thereon to which a link 85 is pivoted. The link 85 extends forwardly to the control panel on the vehicle 20 where the operating valve 70 is located, and is interconnected to the operating lever (not shown) of the valve 70 in such a way that the pawls 81 and 82 are raised when the valve 70 is operated to lower the platform 23, but are allowed to engage the racks 78 and 79 at all other times. The racks 78 and 79 and pawls 81 and 82 thus insure that the platform 23 will be safely supported in case of failure of the hydraulic system, for it is only when the operator is actually lowering the platform intentionally that the pawls 80 and 82 are disengaged.

A similar safety mechanism is provided at the top of the frames 24 and 25, as shown in Figures 6 and 11. As shown in Figure 6, a pair of stationary racks 86 and 87 are fixed to the underside of the platform 23. Aligned with the racks 86 and 87, mounting ears 88 are fixed to the pivot shaft 39 which connects the truss members 26 to the slide blocks 35. As illustrated in Figure 11, the mounting ears 88 have pawls 89 and 90 pivoted thereto. The pawls 89 and 90 are spring pressed into engagement with the racks 86 and 87 so as to prevent movement of the pivot shaft 39 in a direction to retract the frames 24 and 25. The mounting ears 88 also carry small hydraulic cylinders 91 which have pistons 91a pivoted to the pawls 89 and 90. When pressure is supplied to the cylinders 91, their pistons are extended to move the pawls 89 and 90 out of engagement with the racks to permit the platform 23 to be lowered. The cylinders 91 are connected by fluid lines 92 to the supply lines 63 of the upper cylinders 54 and 55. When the pressure in the lines 63 drops below a predetermined value, indicating a failure of the hydraulic system, or that the valve 70 has been operated to permit the platform to be lowered too rapidly, the cylinders 91 cease to hold the pawls 89 and 90 out of engagement with the racks 86 and 87, and they are engaged, stopping descent of the platform 23.

Figures 12 to 14 inclusive, illustrate a somewhat modified form of the invention wherein the cylinders 51, 52, 54 and 55 and the hydraulic jacks 56 and 57 are replaced by screws. As shown in Figure 12, the screw 100 may be provided within each of the rearwardly extending frame members 40. The screws 100 are supported by bearings 101 and have threaded portions 100a which extend rearwardly therefrom into the leg portions 41 of the yoke 43. Each of the leg portions 41 of the yoke 43 has a threaded nut 102 fixed therein which receives the portion 100a of the screw 100. It will be understood that rotation of the screws 100 in the bearings 101 will cause the nuts 102, and consequently the yoke 43, to be moved longitudinally to raise or lower the platform 23.

In order to rotate the screws 100 to raise or lower the platform 23, sprockets 103 are fixed at the forward ends thereof. The sprockets 103 are driven through chains 104 by a hydraulic motor 105. The motor 105 is operable in either direction, and is driven by fluid from the pump 72. Figure 14 illustrates the manner in which assisting screw means are provided beneath the platform 23 in place of the cylinders 54 and 55. As shown in Figure 14, a screw 106 is provided between each pair of channel members 33 and 34. The screws 106 are supported by bearings 107 and have thereon threaded portions 106a. Slide blocks 35' are provided between the channels 33 and 34 in the same manner as in the main form of the invention. The slide blocks 35' have threaded apertures 108 therein which receive the threaded portions of the screws 106. As the screws 106 are rotated, the slide blocks 35' are moved longitudinally within the channels 33 and 34, thereby assisting in extension and retraction of the frames 24 and 25 as in the main form of the invention. To rotate the screws 106, sprockets 109 are fixed at the forward ends thereof. The sprockets 109 are driven by chains 110 that are connected to drive sprockets 111 on a hydraulic motor 112 mounted beneath the platform 23. The hydraulic motor 112 is operable in either direction and is driven by fluid from the pump 72.

With the construction shown in Figures 12 and 14, the platform 23 may be raised or lowered by operation of the pump 72 to drive hydraulic motors 105 and 112. When the motors 105 and 112 are stopped, the screws 100 and 106 are stopped and the platform is supported securely in any adjusted position. With this form of the invention it is unnecessary to provide any safety device to hold the platform in case of hydraulic failure since the screws 100 and 106 lock the platform in any position the instant the motors 105 and 112 are stopped.

To provide the initial lift for the platform 23 in this form of the invention, two vertical telescoping screws 113 are mounted on the support 58 in place of the jacks 56 and 57, as shown in Figure 12. The telescoping screws 113 are raised and lowered by means of sprockets 114 fixed thereon. The sprockets 114 are driven from a hydraulic motor 115 by drive sprockets 116 and chains 117. The hydraulic motor 115 is, like motors 105 and 112, driven from the pump 72.

In Figures 15 and 16 of the drawings, we have shown a modified form of the invention wherein the vertical jacks 56′ and 57′ operate against a cross bar 119 mounted between the pins 29 of the uppermost set of truss members 26 and 27 of the frames 24 and 25. By providing the jacks 56′ and 57′ in such a manner that their yokes 59′ engage the cross bar 119 instead of the bars 60 on the platform 23, it is possible to exert more initial lift on the platform with the same movement of the jacks 56′ and 57′. While this necessitates more force on the jacks 56′ and 57′, it increases the advantage of the cylinders 51, 52, 54 and 55.

It will be noted that as the frames 24 and 25 are extended vertically, the center pivot pins 29 move longitudinally toward the front end of the vehicle 20. Since the jacks 56′ and 57′ are mounted on the frame 21 of the vehicle 20, some means must be provided to compensate for this forward movement to permit the yokes 59′ to remain in engagement with the cross bar 119 during the lifting period. To accomplish this, we mount the jacks 56′ and 57′ upon transverse pivot pins 120 supported in braces 121 between a pair of laterally extending channel members 122 and 123 that take the place of the transverse support 58 of the main form of the invention. With this construction the jacks 56′ and 57′ are able to pivot in a fore and aft direction to follow the movement of the cross bar 119.

The jacks 56′ and 57′ do not follow the cross bar 119 to the full extension of the frames 24 and 25, but stop after the frames 23 and 24 have been partially extended, as described earlier herein. In this form of the invention it is necessary that the jacks 56′ and 57′ be held in the forwardly pivoted position they occupy when they reach the top of their stroke at all times when the crossbar is not in engagement with the yokes 59′, to insure proper alignment of the yokes and the cross bar upon re-engagement. This is accomplished by providing a stop member 124 in front of each jack 56′ and 57′ to engage the jack at the position it occupies when the cross bar 119 leaves the yoke 59′, and hold the jack in proper alignment for reseating the cross bar 119. The stop members 124 are provided in the form of adjustable bolts threaded into ears 125 mounted on the channel member 122. In order to keep the jacks 56′ and 57′ pivoted over against the stops 124, spring pressed pins 126 are provided. The pins are slidably mounted in cylinders 127 mounted on lugs 128 fixed to the channel member 123, and are pressed against the jacks 56′ and 57′ by springs 129, to hold the jacks against the stops 124. Tension adjustment screws 130 are provided in the cylinders 127 to adjust the spring pressure against the pins 126.

It should be apparent from the foregoing that the present invention provides a simple, safe and economical device for supporting a platform at any desired elevation. The use of the device is simple. When it is desired to reach a particular point spaced above the ground, the vehicle 20 is put in position adjacent the point to be reached, and an operator ascends to the platform 23 which is initially in its retracted position, by means of the ladder 118 provided behind the cab of the vehicle 20. When the operator is in place, the pump 72 is set in motion to provide pressure for the cylinders 51, 52, 54 and 55 and the jacks 56 and 57. The valve 70 is operated to send fluid to the jacks 56 and 57 and to the cylinders 51, 52, 54 and 55, to extend the frames 24 and 25 and raise the platform 23. When the platform 23 has been raised far enough, the valve 70 is operated to stop the ascension and hold the platform 23 in place. When the work has been completed the valve 70 is operated to cause the cylinders 51, 52, 54 and 55 to retract the frames 24 and 25 and lower the platform 23.

It is believed that the nature and advantages of our invention appear clearly from the foregoing.

Having thus described our invention, we claim:

1. A portable platform elevating device comprising a supporting frame including transversely spaced tubular frame members, a yoke member having transversely spaced horizontal legs slidably received in said tubular frame members, a pair of vertical lazy tong frames each including pairs of truss members pivotally connected together at their ends, the truss members of each pair being pivoted together at their centers, said lazy tong frames being vertically extensible and retractable by movement of the ends of said truss members horizontally toward and away from each other, one of the truss members of the lowermost pair of each lazy tong frame being pivoted to the supporting frame, and the other of the truss members of said lowermost pair being pivoted to said yoke, whereby to cause said lazy tong frame to be vertically extended and retracted upon movement of the yoke toward and away from the supporting frame, means connected between the supporting frame and the yoke to move the yoke toward and away from the supporting frame, and a platform supported at the upper ends of the lazy tong frames.

2. The device of claim 1 wherein the means connected between the supporting frame and the yoke to move the yoke comprises an hydraulic cylinder fixed to each of the spaced tubular frame members and having a piston therein fixed to said yoke and operable to move the yoke toward and away from the cylinders upon introduction of fluid into the cylinders, and means to supply fluid under pressure to said cylinders in equal volumes.

3. The device of claim 1 wherein the means connected between the supporting frame and the yoke to move the yoke comprises a threaded shaft extending axially in each tubular frame member, bearing means supporting said shaft in the tubular frame members, an internally threaded nut member fixed to each leg of said yoke member, said nut member being threaded on said shaft whereby to move the yoke upon rotation of the shafts, and means to rotate the shafts in unison.

4. A portable platform elevating device comprising a supporting frame including transversely spaced tubular frame members, a yoke member having transversely spaced horizontal legs slidably received in said tubular frame members, a pair of vertical lazy tong frames each including pairs of truss members pivotally connected together at their ends, the truss members of each pair being pivoted together at their centers, said lazy tong frames being vertically extensible and retractable by movement of the ends of said truss members horizontally toward and away from each other, one of the truss members of the lowermost pair of each lazy tong frame being pivoted to the supporting frame, and the other of the truss members of said lowermost pair being pivoted to said yoke, whereby to cause said lazy tong frame to be vertically extended and retracted upon movement of the yoke toward and away from the supporting frame, means connected between the supporting frame and the yoke to move the yoke toward and away from the supporting frame, a platform positioned at the tops of said lazy tong frames, guide means beneath said platform, slide means in said guide means, one of the truss members of the uppermost pair of each lazy tong frame being pivoted to the platform, the other truss member of said uppermost pair being pivoted to said slide means, and means to move said slide means horizontally in the guide means to extend and retract the lazy tong frames.

5. In a portable platform elevating device including a pair of spaced apart lazy tong frames each comprising pairs of truss members pivotally connected together at their ends, the truss members of each pair being pivoted to each other at their centers, the lazy tong frames being vertically extensible and retractable by horizontal movement of the ends of the truss members of each pair toward and away from each other, and a platform supported at the tops of the lazy tong frames, the improvement in means for raising and lowering the platform comprising a supporting frame beneath the lazy tong frames, yoke means on the frame, guide means supporting said yoke means to limit movement of said yoke means in a fore and aft direction on the frame, and means to move said yoke in the guide means, one of the truss members of the lowermost pair of truss members of each lazy tong frame being pivoted to the supporting frame at a point longitudinally spaced from the yoke means, the other truss member of said pair being pivoted to the yoke means whereby movement of the yoke means will cause vertical extension and retraction of the lazy tong frame.

6. The device of claim 5 wherein the guide means for the yoke means comprises transversely spaced longitudinally extending tubular frame members and the yoke means includes longitudinally extending legs slidably received in said tubular frame members and operable to telescope therein.

7. The device of claim 5 wherein the means to move the yoke in the guide means comprises two transversely spaced hydraulic cylinders secured to the supporting frame and having pistons therein secured to the yoke, and means to supply fluid under pressure to said cylinders in equal volumes.

8. The device of claim 6 wherein the means to move the yoke comprises two transversely spaced hydraulic cylinders secured to the tubular frame members and aligned axially therewith, said cylinders having pistons therein connected to the yoke, and means to supply fluid under pressure to the cylinders in equal volumes.

9. The device of claim 5, together with a ratchet movable with the yoke means, a pawl on the supporting frame normally engaging said ratchet and preventing movement of the yoke means in a direction to lower the platform, said pawl being connected to the yoke moving means to release the ratchet upon actuation of the yoke moving means to lower the platform.

10. A portable platform elevating device comprising a supporting frame including transversely spaced tubular frame members, a yoke member having transversely spaced horizontal legs slidably received in said tubular frame members, a pair of vertical lazy tong frames each including pairs of truss members pivotally connected together at their ends, the truss members of each pair being pivoted together at their centers, said lazy tong frames being vertically extensible and retractable by movement of the ends of said truss members horizontally toward and away from each other, one of the truss members of the lowermost pair of each lazy tong frame being pivoted to the supporting frame, and the other of the truss members of said lowermost pair being pivoted to said yoke, whereby to cause said lazy tong frame to be vertically extended and retracted upon movement of the yoke toward and away from the supporting frame, a platform positioned at the tops of said lazy tong frames, guide means beneath said platform, slide means in said guide means, one of the truss members of the uppermost pair of each lazy tong frame being pivoted to the platform, the other truss member of said uppermost pair being pivoted to said slide means, means to move said slide means horizontally in the guide means to extend and retract the lazy tong frames, ratchet bars fixed to the platform adjacent to said guide means, pawls moving with said slide means normally engaging the ratchet bars and preventing movement of the slide means in a direction to lower the platform, said pawl being connected to the slide moving means to release the ratchet bars upon actuation of the slide moving means to retract the lazy tong frames.

11. A portable platform elevating device comprising a supporting frame, yoke means supported on said frame for movement in a fore and aft direction, a pair of lazy tong frames, each of said lazy tong frames including pairs of truss members pivotally connected to each other at their ends, the truss members of each pair being pivoted to each other at their centers, said lazy tongs being vertically extensible and retractable by horizontal movement of the ends of the truss members toward and away from each other, one of the truss members of the lowermost pair of each lazy tong frame being pivoted to the supporting frame and the other truss member of said pair being pivoted to the yoke means, a platform supported at the tops of said lazy tong frames means to move said yoke means fore and aft whereby to extend and retract the lazy tong frames to raise and lower the platform, a cross bar connecting the uppermost pairs of truss members of the lazy tong frames with each other at their centers, a jack pivoted on the supporting frame adjacent to each of said lazy tong frames to swing fore and aft on the frame, each jack having a seat at the top thereof to receive the cross bar and supporting it for at least the lower portion of its up and down movement as the platform is raised and lowered, and means on the support frame yieldingly holding the jacks, when extended, with their seats in the path of movement of said cross bar.

References Cited in the file of this patent

UNITED STATES PATENTS

| 399,220 | Timroth | Mar. 5, 1889 |
| 636,445 | McCabe et al. | Nov. 7, 1899 |
| 1,095,391 | Fogle | May 5, 1914 |
| 2,132,343 | Jarrett | Oct. 4, 1938 |
| 2,706,102 | Cresci | Apr. 12, 1955 |
| 2,818,567 | Oliver | Jan. 7, 1958 |

FOREIGN PATENTS

| 85,190 | Norway | Mar. 14, 1955 |
| 755,214 | Great Britain | Aug. 22, 1956 |